Sept. 2, 1969          J. MORTON          3,464,449
BALL VALVE WITH DRAIN PASSAGE
Filed April 17, 1968                      2 Sheets-Sheet 1
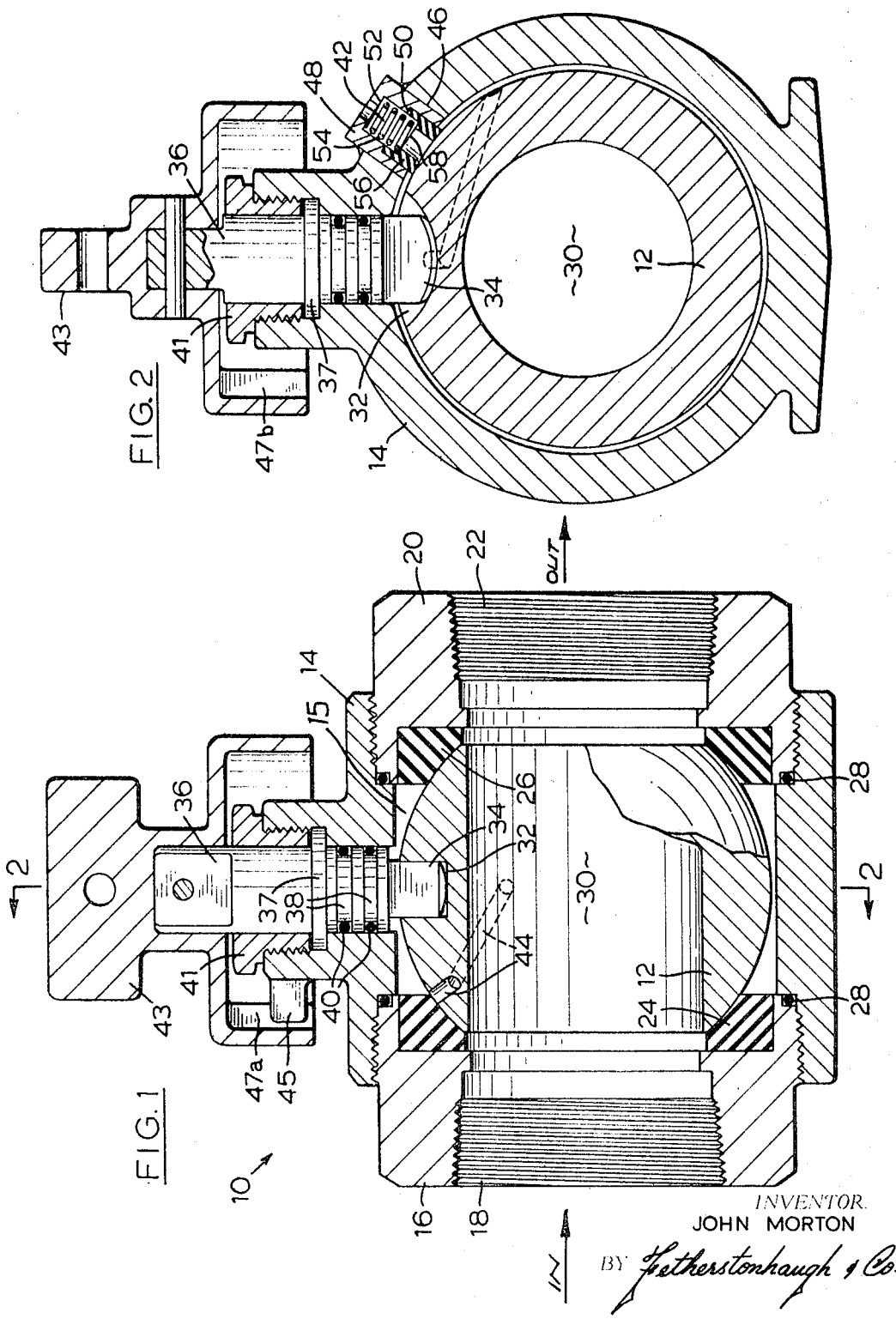
INVENTOR.
JOHN MORTON
BY Fetherstonhaugh & Co.
ATTORNEYS Sept. 2, 1969 J. MORTON 3,464,449
BALL VALVE WITH DRAIN PASSAGE
Filed April 17, 1968 2 Sheets-Sheet 2

INVENTOR.
JOHN MORTON
BY Featherstonhaugh & Co.
ATTORNEYS

United States Patent Office 3,464,449
Patented Sept. 2, 1969

3,464,449
BALL VALVE WITH DRAIN PASSAGE
John Morton, London, Ontario, Canada, assignor to
Emco Limited, London, Ontario, Canada
Filed Apr. 17, 1968, Ser. No. 722,111
Claims priority, application Canada, July 4, 1967,
994,482
Int. Cl. F16k 5/20, 45/00; E03b 7/08
U.S. Cl. 137—625.24                            1 Claim

ABSTRACT OF THE DISCLOSURE

This invention relates to the drainage of ball valves. In particular the invention relates to the provision of suitable drain passage means in a ball valve to permit drainage of the discharge line when the valve is in a closed position. Difficulty has been experienced in providing for the drainage of ball valves due to the fact that when the valve is in the closed position the ball is seated against the sealing ring of the discharge line and is not sealed against the input line. Because of this characteristic it has not been possible to use the simple drainage passage which is commonly employed with the tapered plug type valve. The present invention overcomes these difficulties by providing a first drainage passage formed in the casing and a second drainage passage formed in the ball valve and sealing means to provide a fluid seal between the two passages when they are in alignment and to prevent leakage from the valve when the passages are out of alignment. The first and second passages are arranged such that they will align with one another when the valve is in a closed position to provide a drainage passage opening outwardly of the valve from the discharge passage of the valve. When the valve is in the open position the drainage passages are out of alignment with one another such that no fluid can escape through the first drainage passage and thereby escape from the valve casing.

Field of invention

This invention relates to the drainage of ball valves. In particular this invention relates to the provision of suitable passage means in a ball valve to permit drainage of the discharge line when the valve is in a closed position.

Description of prior art

In order to prevent freezing of water in a pipe it is common to provide a drainage passage for the discharge line of a valve so that water will not be retained in the discharge line when the valve is closed. Heretofore most of the valves which have been used for controlling the main water supply have been of the tapered plug type. In this type of valve the plug is sealed within the valve seat due to the complementary taper formed on the plug and in the valve seat and this seal extends around all of the diameter of the plug. The only point at which the seal is broken is where the through passage is formed in the tapered plug. In view of this construction it was very simple to provide a simple passage in the wall of the casing and in the wall of the tapered plug to permit water to flow from the discharge line through the central passage formed in the tapered plug and out through the wall of the casing.

Ball-shaped valves have recently become popular for use is this type of installation and are favoured because of their simple construction and reliability. However difficulty has been experienced in attempting to provide a suitable drainage passage for draining the discharge line when the valve is closed. This difficulty has arisen due to the fact that when the valve is in the closed position the ball is seated against the sealing ring of the discharge line and is not sealed against the sealing ring of the input line. This means that it is possible for the main supply of fluid to enter the space between the ball-shaped valve and the housing and consequently it is not possible to employ the drainage passage system used in the construction of the tapered plug type valve.

Summary of invention

The present invention relates to an improvement in a valve of the type having a ball-shaped valve member formed with a through passage and a valve housing formed with a valve chamber, an input passage and a discharge passage. The improvement of the present invention lies in the provision of a first drainage passage formed in the casing and a second drainage passage formed in the ball valve and sealing means to provide a fluid seal between the two passages when they are in alignment and to prevent leakage from the valve when the passages are out of alignment. The first and second passages are located such that they will align with one another when the valve is in a closed position to provide a drainage passage opening outwardly of the valve from the discharge passage of the valve. When the valve is in an open position and the drainage passages are out of alignment with one another such that no fluid can escape through the first drainage passage and thereby escape from the valve casing.

The invention will be more clearly understood after reference to the following detailed specification read in conjunction with the drawings.

Brief description of drawings

FIGURE 1 is a sectional side view of the valve housing with the partially broken away ball valve in the open position.

FIGURE 2 is a sectional end view taken in the direction of the arrow 2—2 of FIGURE 1.

Description of the preferred embodiments

Figure 3:
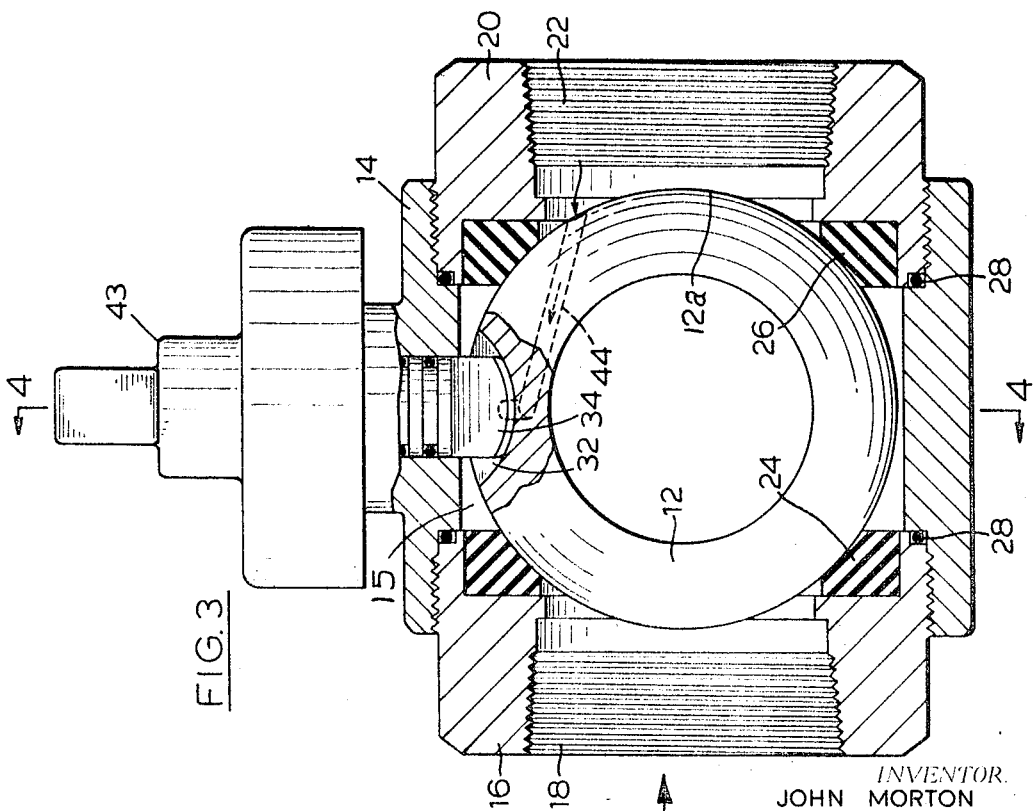
FIGURE 3 is a partially sectioned side view showing the ball valve in a closed position.

Referring to the drawings reference numeral 10 refers generally to a valve of the type commonly known as a ball valve. A ball-shaped valve member 12 is rotatably mounted within the valve chamber 15 of the valve housing 14. One end of the valve housing 14 is adapted to threadably receive an input coupling 16 which is formed with an input passage 18 and the other end of the valve housing 14 is adapted to threadably receive an output coupling 20 which is formed with an output passage 22. A ball valve sealing ring 24 is carried by the input coupling 16 and is adapted to sealingly engage the ball valve. A similar ball valve sealing ring 26 is carried by the output coupling 20 and is adapted to co-operate with the ball-shaped valve member to prevent the passage of fluid through the valve when the valve is in a closed position as shown in FIGURE 3 of the drawings.

The ball valve member 12 is rotatably mounted within the valve chamber and is formed with a through passage 30. When the valve is in the open position the through passage 30 is in alignment with the input passage 18 and the discharge passage 22. When the valve is in the closed position as shown in FIGURE 3, the ball valve member 12 is in a position substantially at right angles to the open position and the discharge passage 22 is closed by a portion 12a of the wall of the ball valve which is hereinafter referred to as the discharge passage closure wall.

The ball valve member 12 is formed with a semi-circular recess 32 at its upper end to receive the lower end 34 of the valve stem 36. The valve stem is provided with suitable recesses 38 and O-rings 40 which serve to maintain a fluid seal between the valve stem and the wall of the casing. The valve stem is formed with a shoulder 37 which is maintained in a sliding relationship within the valve housing by means of a locking ring 41 which is threadably mounted in the open end of the valve stem passage of the valve. A suitable adjustment handle 43 is rigidly mounted on the free end of the valve stem 36. The handle 43 is provided with suitable flats for co-operation with a conventional adjustment wrench. The movement of the adjustment handle 43 is limited to a substantially 90° rotation about the longitudinal axis of rotation of the stem by means of shoulders 47a and 47b which are formed integral with the handle and react against stop 45 which is formed integral with the valve housing 14.

The improvement of the present invention lies in the provision of a first drainage passage means 42 which is formed in the valve housing 14 and a second drainage passage means 44 which is formed in the ball valve member 12.

The first drainage passage 42 is formed by providing an opening 46 which extends through the wall of the housing 14 and reopens into valve chamber 15 and rigidly locating an insert member 48 in the opening 46 by brazing, welding or threading into position. The insert member 48 is formed to provide a first shoulder 50 and a second shoulder 52 which are axially in alignment with the first drainage passage 42. A spring member 54 is mounted within the insert member 48 and is engaged at one end by the shoulder 52. A drainage sealing passage 56 is formed to fit closely within the insert member and is adapted to rest against the shoulder 50. The other end of the spring 54 extends into the sealing member 56 and presses against the shoulder 58 which is formed in the sealing member 56. When the insert member 48 is located as shown in FIGURE 2 of the drawings, the spring 54 forces the sealing member 56 against the outer surface of the ball valve member 12. The sealing member 56 is preferably made from rubber or some other similar resilient sealing material. Due to the pressure applied by the spring 54 on the sealing member 56 there is no direct communication between the valve chamber and the first drainage passage 42. It will be noted that in the embodiment illustrated in the drawings the sealing member 56 will always rest against a portion of the ball valve regardless of the position of the ball valve and will under no circumstances have any direct communication with the through passage 30 formed in the ball valve. The portion of the ball valve against which the sealing member bears is hereinafter referred to as the first drainage passage sealing surface and in the embodiment illustrated this surface extends through a 90° arc generated about the axis of rotation of the ball valve member.

The second drainage passage 44 is formed in the ball valve member 12 and extends continuously from an opening in the outer surface of the closure wall 12a to an opening in the first drainage passage sealing surface of the ball valve member. The second drainage passage 44 provides fluid communication between the discharge passage 22 and the first drainage passage 42 when the ball valve member 12 is in a closed position. When the ball valve member 12 is rotated from the closed position to the open position the second drainage passage 44 is placed out of alignment with the first discharge passage 42 and consequently there is no flow of liquid out of the second discharge passage 42.

When the valve is in the closed position the pressure head of liquid in the discharge line will cause the liquid to drain through the second drainage passage 44 and then through the first drainage passage 42 to be discharged from the valve.

Figure 4:
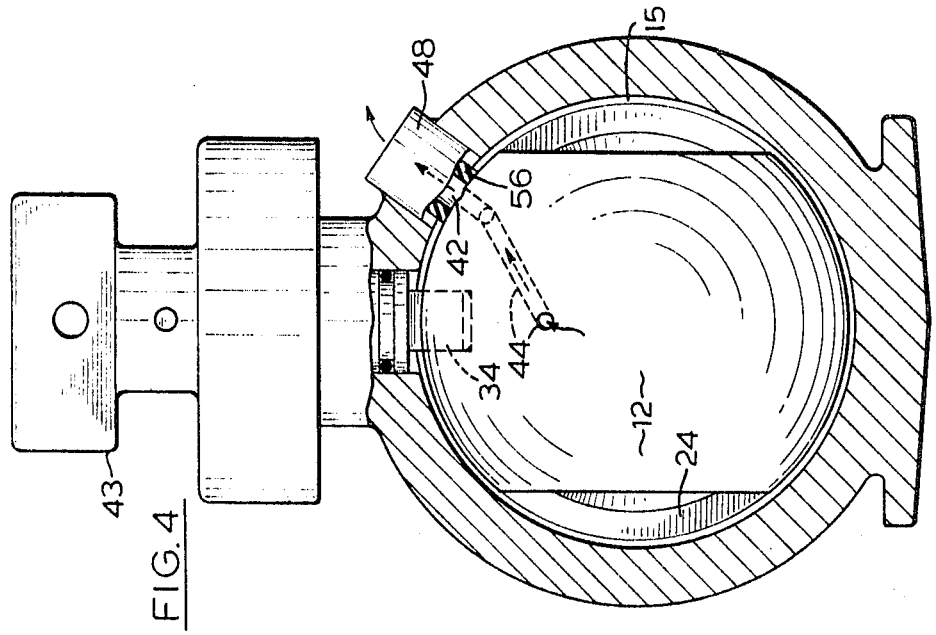
FIGURE 4 is a partially sectioned end view taken in the direction of the arrow 4—4 of FIGURE 3.

Referring to FIGURES 2 and 4 it will be seen that when the valve is in both the open and the closed position, there is a substantial clearance between the outer surface of the ball valve and the inner surface of the valve casing and this clearance has prevented others from employing the same drainage system as that normally employed with the tapered plug type of valve. If drainage was provided by means of a simple passage through the wall of the casing, this passage would communicate with the clearance space between the ball valve and the valve casing and constant leakage from the valve would occur.

It will be readily apparent that existing valves may be modified without any difficulty to include the improved drainage passage means of the present invention. In another embodiment of the invention the ball valve member may have two second drainage passages to permit the ball valve to be rotated through 360° while having two closed positions each having provision for drainage of the discharge conduit.

In view of the fact that a valve can easily be modified from a valve which does not have a drainage system to one which does have a drainage system, the present invention enables a manufacturer to stock valves which do not have a drainage system and to modify these valves to a drainage system when required.

What I claim is:

1. A valve comprising, a valve housing having a valve chamber formed therein, said housing having an input passage and a discharge passage, a rotatable ball valve member within said valve chamber and mounted for rotation about a longitudinal axis, said ball valve member being formed with a cylindrically shaped through passage means having an axis extending transversely of the longitudinal axis and adapted to align with the input passage and discharge passage of said housing when said valve is in an open position, said ball valve member having at least one discharge passage closure wall adapted to close said discharge passage when said valve is in a closed position, ball valve sealing means cooperating with said ball valve member to prevent the passage of fluid through the valve when said valve is in a closed position, first drainage passage means formed in said housing and opening into said valve chamber, said first drainage passage being formed in a portion of said housing disposed outwardly from the plane of rotation of the axis of said through passage in the direction of the longitudinal axis of rotation of said valve member a distance greater than the radius of said through passage whereby upon rotation of said ball valve member about said longitudinal axis said first drainage passage cannot at any time communicate with said through passage of said valve, first drainage passage sealing means carried by said housing, said ball valve member having a continuous first drainage passage sealing surface extending through at least a 90° arc generated about said axis of rotation and co-operating with said first drainage passage sealing means to prevent fluid escaping from said valve chamber by way of said first drainage passage, second drainage passage means formed in said ball valve member and extending continuously from an opening in the outer surface of said closure wall to an opening in said first drainage passage sealing surface, said first and second drainage passage means being located to align with one another when said valve is in a closed position to provide a continuous drainage passage leading outwardly of said valve from said discharge passage of said valve, said first and second passages being misaligned when said valve is in an open position to prevent drainage through said first passage, said first drainage passage sealing means being adapted to co-operate with said sealing surface of said ball valve member to provide a sealed connection between said first and second drainage passages when said drainage passages are aligned.

References Cited

UNITED STATES PATENTS

| | | | |
|---|---|---|---|
| 1,094,670 | 4/1914 | McTaggart | 137—625.22 XR |
| 3,056,418 | 10/1962 | Adams et al. | 251—315 XR |
| 3,370,612 | 2/1968 | Holl | 137—625.47 |

FOREIGN PATENTS

| | | |
|---|---|---|
| 744,193 | 1/1944 | Germany. |

HENRY T. KLINKSIEK, Primary Examiner

U.S. Cl. X.R.

251—315